United States Patent
Kikuchi

(10) Patent No.: US 11,783,497 B2
(45) Date of Patent: Oct. 10, 2023

(54) POSITION MEASURING DEVICE, POSITION MEASURING METHOD, AND RECORDING MEDIUM

(71) Applicant: CASIO COMPUTER CO., LTD., Tokyo (JP)

(72) Inventor: Masaaki Kikuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 202 days.

(21) Appl. No.: 17/195,472

(22) Filed: Mar. 8, 2021

(65) Prior Publication Data

US 2021/0295539 A1 Sep. 23, 2021

(30) Foreign Application Priority Data

Mar. 23, 2020 (JP) ................. 2020-050996

(51) Int. Cl.
*G06T 7/73* (2017.01)
*G06T 7/285* (2017.01)
*G06T 7/246* (2017.01)

(52) U.S. Cl.
CPC .............. *G06T 7/285* (2017.01); *G06T 7/246* (2017.01); *G06T 7/73* (2017.01); *G05D 2201/0216* (2013.01); *G06T 2200/04* (2013.01); *G06T 2207/30241* (2013.01)

(58) Field of Classification Search
CPC ........... G06T 7/20; G06T 7/246; G06T 7/248; G06T 7/251; G06T 7/70; G06T 7/73; G06T 7/74; G06T 7/75; G06T 2207/30204; G06T 2207/30208
See application file for complete search history.

(56) References Cited

U.S. PATENT DOCUMENTS

| 9,782,229 B2 * | 10/2017 | Crawford et al. ..... A61B 50/13 |
| 2017/0178360 A1 * | 6/2017 | Baggen et al. ....... G06F 1/1694 |
| 2020/0175716 A1 * | 6/2020 | Miyamoto ................. G06T 7/73 |

FOREIGN PATENT DOCUMENTS

| CN | 108306682 A | 7/2018 |
| CN | 109756667 A | 5/2019 |
| JP | WO2005/086375 A1 | 1/2008 |
| JP | WO2005/124687 A1 | 4/2008 |
| JP | 2018-113600 A | 7/2018 |
| JP | 2019-109174 A | 7/2019 |

OTHER PUBLICATIONS

CNIPA; Application No. 202110262758.2; Office Action dated Jan. 12, 2023.

* cited by examiner

*Primary Examiner* — Andrew W Johns
(74) *Attorney, Agent, or Firm* — Fitch, Even, Tabin & Flannery LLP

(57) ABSTRACT

A position measuring device comprising includes an imager, and at least one processor configured to execute a program stored in a memory. The at least one processor detects, from an imaging range of a picture image acquired by the imager, a light-emitter image of a first light emitter that is capable of movement in a space and emits light corresponding to identification information of the first light emitter in the space, and acquires a three-dimensional position of the first light emitter in the space based on a position of the detected light-emitter image of the first light emitter in the picture image.

14 Claims, 13 Drawing Sheets

POSITION MEASURING DEVICE, POSITION MEASURING METHOD, AND RECORDING MEDIUM

CROSS-REFERENCE TO RELATED APPLICATION

This application claims the benefit of Japanese Patent Application No. 2020-050996, filed on Mar. 23, 2020, the entire disclosure of which is incorporated by reference herein.

FIELD

This application relates generally to a position measuring device, a position measuring method, and a recording medium.

BACKGROUND

Technology is mentioned in International Publication No. WO 2005/124687 that uses visible light communication in which cameras image a marker that is light-emitting means to determine a three-dimensional position of the marker in a space.

However, when there are numerous blind areas in the space, sometimes the marker can be imaged only by a single camera as imaging means. Due to the inability to determine the three-dimensional position of the marker in such a case, personnel must perform cumbersome operations such as manually recording the three-dimensional position.

SUMMARY

In order to solve the aforementioned problem, a position measuring device includes an imager and at least one processor configured to execute a program stored in a memory. The at least one processor detects, from an imaging range of a picture image acquired by the imager, a light-emitter image of a first light emitter that is capable of movement in a space and emits light corresponding to identification information of the first light emitter in the space, and acquires a three-dimensional position of the first light emitter in the space based on a position of the detected light-emitter image of the first light emitter in the picture image.

In order to solve the aforementioned problem, a position measuring method for a position measuring device includes detecting, from an imaging range of a picture image acquired by an imager, a light-emitter image of a first light emitter that is capable of movement in a space and emits light corresponding to identification information of the first light emitter in the space, and acquiring a three-dimensional position of the first light emitter in the space based on a position of the detected light-emitter image of the first light emitter in the picture image.

In order to solve the aforementioned problem, a non-transitory computer-readable recording medium records a program executable by at least one processor of a position measuring device. The program causes the at least one processor to detect, from an imaging range of a picture image acquired by an imager, a light-emitter image of a first light emitter that is capable of movement in a space and emits light corresponding to identification information of the first light emitter in the space, and acquire a three-dimensional position of the first light emitter in the space based on a position of the detected light-emitter image of the first light emitter in the picture image.

BRIEF DESCRIPTION OF THE DRAWINGS

A more complete understanding of this application can be obtained when the following detailed description is considered in conjunction with the following drawings, in which.

DETAILED DESCRIPTION

A visible light communication system as an information processing system according to Embodiment 1 of the present disclosure is described below with reference to drawings.

Figure 1:
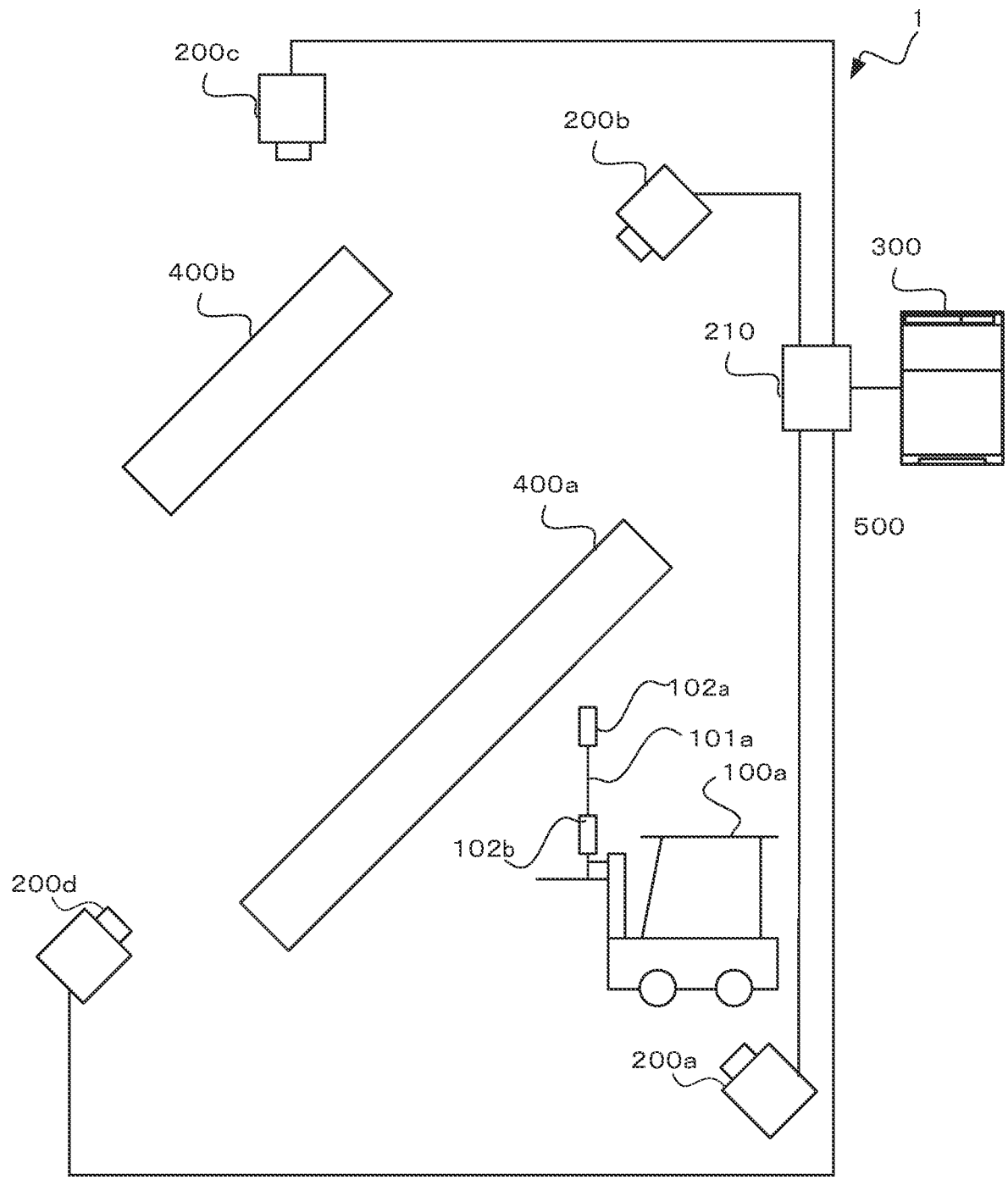
FIG. 1 illustrates an example of a visible light communication system according to Embodiment 1 of the present disclosure.

FIG. 1 illustrates an example of configuration of a visible light communication system 1. As illustrated in FIG. 1, shelves 400a and 400b are arranged in a space S in which the visible light communication system 1 is used that includes a forklift 100a, cameras 200a, 200b, 200c, and 200d (referred to appropriately as "camera 200" hereinafter without limitation to the individual cameras 200a, 200b, 200c, and 200d), a hub 210, and a server 300. Directions in the space S are specified by an X axis and a Y axis that are mutually perpendicular and horizontally-directed, and a Z axis that is vertically-directed and perpendicular to both the X axis and the Y axis; and each position within the space S is specified by coordinates on the X axis, Y axis, and Z axis.

The forklift 100a includes a fork 101a that moves in the vertical direction (Z-axis direction) and light emitting diodes (LED) 102a and 102b that are markers (light emitter) attached to the fork 101a. Even though the fork 101a moves, a Z-axis direction distance between the LED 102a and the LED 102b does not change. The server 300 is connected to the cameras 200a-200d via the hub 210.

The LEDs 102a and 102b attached to the forklift 100a each communicate by visible light communication by time-sequential change in light emission in accordance with identification information of the LEDs 102a and 102b, that is, an ID, as information (height information) relating to position in the Z axis direction of the respective LED and that is information of a respective transmission object.

The cameras 200 perform imaging of the entire space S. The server 300 acquires the positions of the LEDs 102a and 102b in a picture image from the picture image of the entire space S obtained by the imaging of the cameras 200, further decodes content of time-sequentially variation in light emission of the LEDs 102a and 102b, and acquires IDs of the LEDs 102a and 102b from the forklift 100a.

Figure 2:
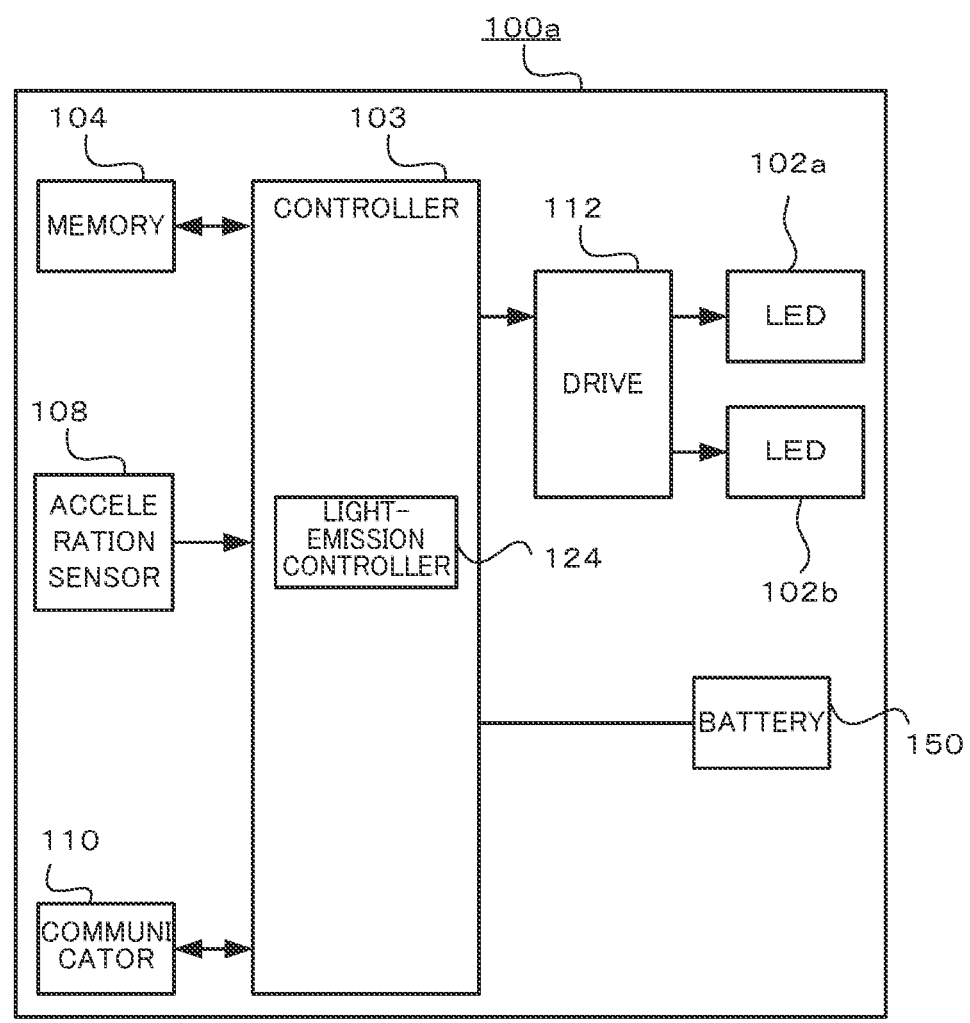
FIG. 2 illustrates an example of configuration of a forklift according to Embodiment 1 of the present disclosure.

FIG. 2 illustrates an example of configuration of the forklift 100a. As illustrated in FIG. 2, the forklift 100a includes LEDs 102a and 102b, a controller 103, a memory 104, an acceleration sensor 108, a communicator 110, a drive 112, and a battery 150.

The controller 103 includes, for example, a central processing unit (CPU). The controller 103 controls various types of functions, provided for the forklift 100a, by executing software processing in accordance with programs stored in the memory 104.

The memory 104 is, for example, random access memory (RAM) or read only memory (ROM). The memory 104 stores various types of information such as programs used for functions such as control of the forklift 100a.

The acceleration sensor 108 detects acceleration of the forklift 100a that occurs in the XY plane defined by the X axis and the Y axis.

The communicator 110, for example, is a local area network (LAN) card. The communicator 110 performs wireless communication with the server 300, for example.

A light-emission controller 124 is included in the controller 103. The light-emission controller 124 senses movement in the vertical direction, that is, the Z-axis direction, of the forklift 101a, and specifies the Z-axis direction position in the space S for the LEDs 102a and 102b attached to the fork 101a. Furthermore, the light-emission controller 124 generates information, that is, height information, relating to the Z-axis direction positions of the LEDs 102a and 102b corresponding to the heights of the LEDs 102a and 102b occurring in the space S. Here, the light-emission controller 124 determines a light-emission pattern for causing time-sequential change in light emission corresponding to an ID that is height information of the LED 102a, and determines a light-emission pattern for causing time-sequential change in light emission corresponding to an ID that is height information of the LED 102b.

Furthermore, the light-emission controller 124 outputs the light-emission pattern information to the drive 112. The drive 112 generates a drive signal for causing time-wise change in the light emission of the LED 102a in accordance with the light-emission pattern information of the LED 102a from the light-emission controller 124, and generates a drive signal for causing time-wise change in the light emission of the LED 102b in accordance with the light-emission pattern information of the LED 102b from the light-emission controller 124. The LEDs 102a and 102b emits light that changes time-wise in accordance with the drive signal output from the drive 112. For example, the light emission colors are the three primary colors, and the colors of the wavelength band used for color modulation in the visible light communication are red (R), green (G), and blue (B).

Figure 3:
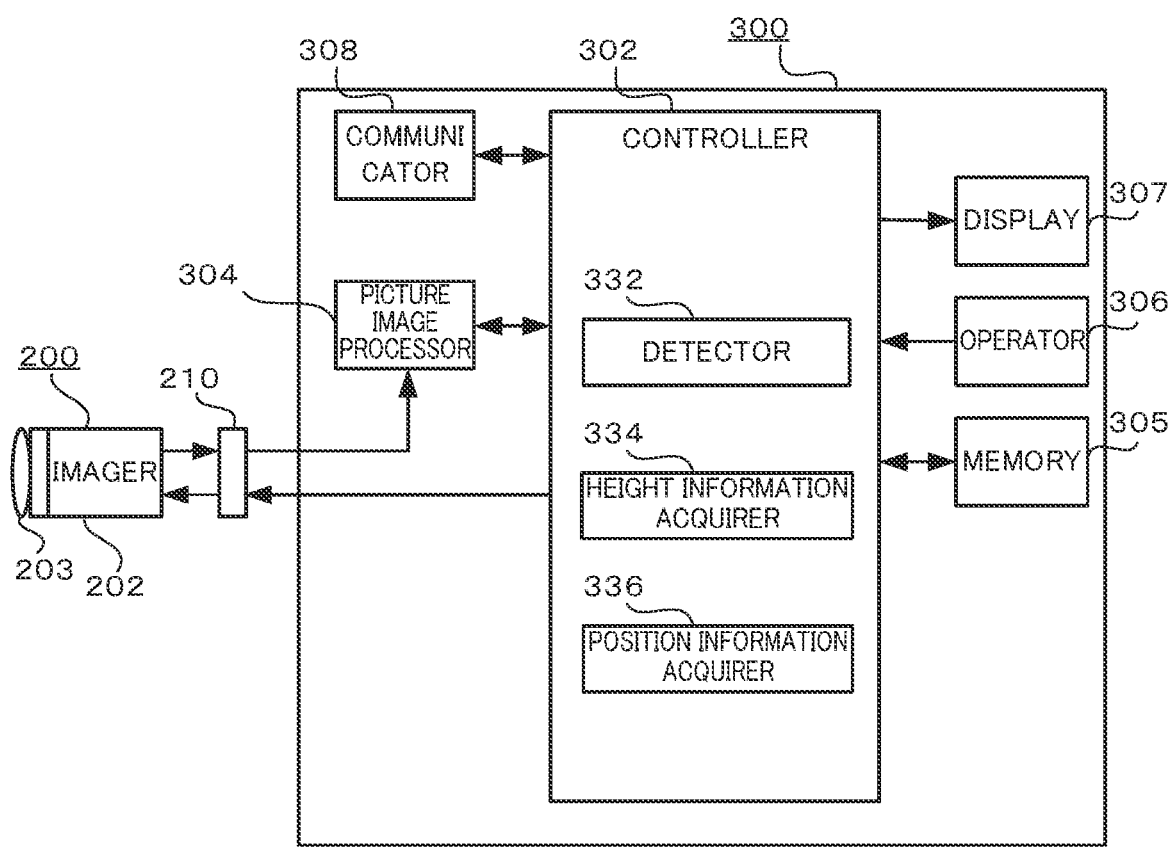
FIG. 3 illustrates an example of configuration of a camera and a server according to Embodiment 1 of the present disclosure.

FIG. 3 illustrates an example configuration of the camera 200 and the server 300. As illustrated in FIG. 3, the camera 200 and the server 300 are connected via the hub 210. The camera 200 includes an imager 202 and a lens 203. The server 300 includes a controller 302, a picture image processor 304, a memory 305, an operator 306, a display 307, and a communicator 308.

The lens 203 within the camera 200 includes a zoom lens, for example. The lens 203 moves due to a zoom control operation from the operator 306 within the server 300 and due to focus control by the controller 302. The view angle and optical image imaged by the imager 202 is controlled via movement of the lens 203.

The imager 202 includes a light-receiving surface that includes an imaging surface of light-reception elements arranged in a regular two-dimensional array. The light-reception elements are those of an imaging device such as a charge coupled device (CCD), a complementary metal oxide semiconductor (CMOS), or the like. The imager 202 performs imaging (light reception) of the optical image formed by entrance of light through the lens 203 at the view angle of a prescribed range based on the control signal from the controller 302 within the server 300, and generates a frame by conversion of the picture image signal within the view angle into digital data. Moreover, the imager 202 continues time-wise the imaging and frame generation, and digital data of a successive frame is output to the picture image processor 304.

The picture image processor 304, based on the control signal from the controller 302, outputs to the controller 302 the digital data of the frames output from the imager 202.

The controller 302 includes a processor such as a CPU, for example. The controller 302, by execution of programs stored in the memory 305, controls various functions with which the server 300 is equipped.

The memory 305 is RAM or ROM, for example. The memory 305 stores various types of information such as programs used for control or the like in the server 300. Moreover, the memory 305 stores a setup position of each camera 200 within the space S, information on an imaging direction and an imaging range, and information on the Z-axis direction distance between the LED 102a and the LED 102b.

The operator 306 includes numeric keyboard keys, function keys, or the like and is an interface used by a user to input operation content. The display 307 includes a liquid crystal display (LCD), a plasma display panel (PDP), an electro-luminescence (EL) display, or the like. The display 307 displays a picture image in according with a picture image signal output from the controller 302. The communicator 308 is a LAN card, for example. The communicator 308 performs communication with an external communication device.

The controller 302 includes an detector 332, a height information acquirer 334, and a position information acquirer 336.

The detector 332, for the digital data of the frames output by the imager 202, acquires a brightness value of each pixel included in the frame. Thereafter, the detector 332 takes the positions of pixels having a brightness value in the frame of at least a prescribed value to be positions of the LEDs 102a and 102b.

Furthermore, the detector 332 performs decoding processing based on change in the light emission occurring at the positions of the LEDs 102a and 102b within the frame.

The height information acquirer 334 acquires the height information transmitted by the LEDs 102a and 102b and obtained by the decoding processing by the detector 332. The position information acquirer 336 acquires the three-dimensional positions of the LEDs 102a and 102b based on the ID that is the height information of the LED 102a and the ID that is the height information of the LED 102b.

Figure 4:
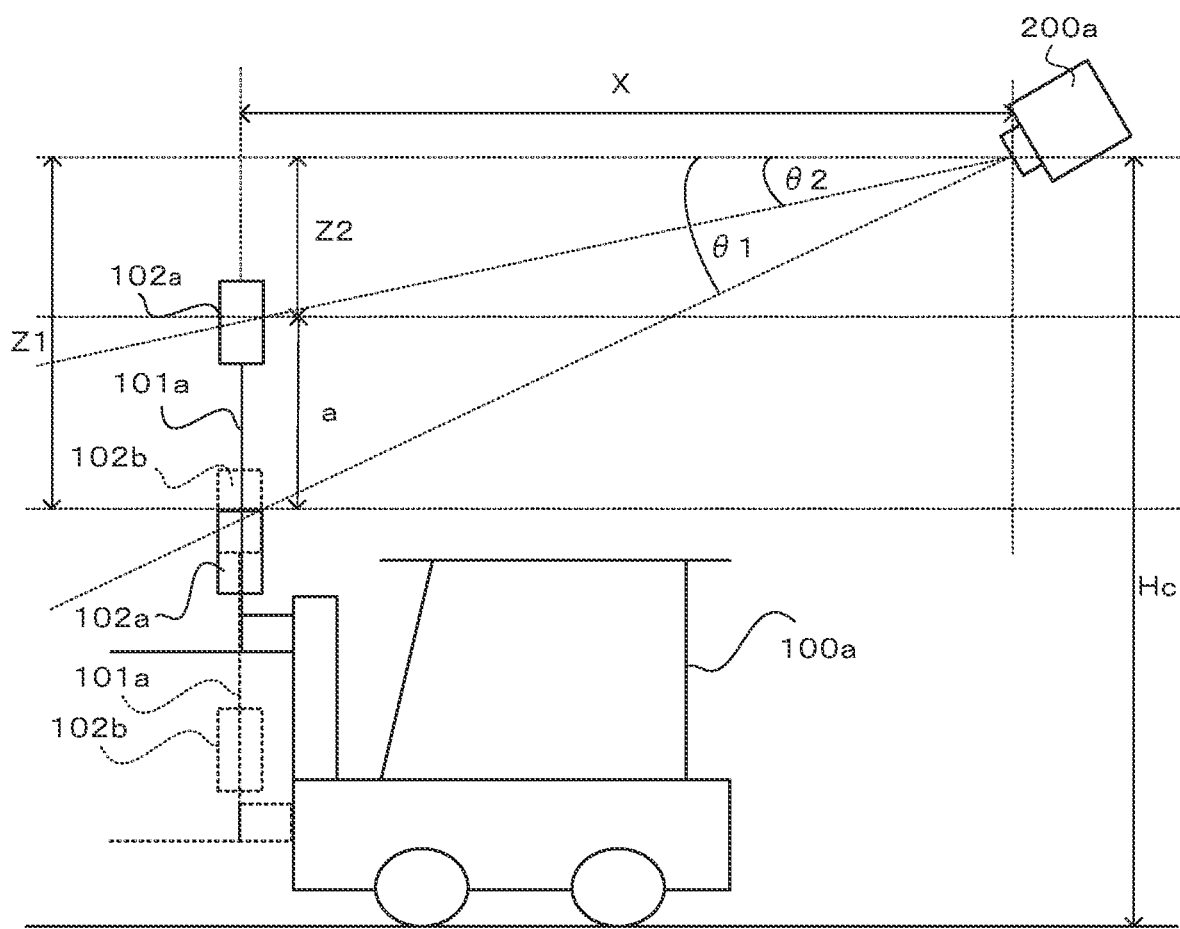
FIG. 4 illustrates an aspect of acquisition of a three-dimensional position of an LED according to Embodiment 1 of the present disclosure.

FIG. 4 illustrates an aspect of acquisition of the three-dimensional positions of the LEDs 102a and 102b. In the example illustrated in FIG. 4, the distance between the LED 102a and the LED 102b has a non-variable value "a". The LED 102a emits light corresponding to the ID thereof as height information, and the LED 102b emits light corresponding to the ID thereof as height information.

In this case, the position information acquirer 336 calculates angles θ1 and θ2 based on the imaging directions, the imaging ranges, and the positions of the LEDs 102a and 102b in the picture image.

Next, by using the formula X=a/(tan θ1−tan θ2), the position information acquirer 336 calculates a distance X between the camera 200a and the LED 102a in the XY plane defined by the X axis and the Y axis by use of (i) a Z-axis direction distance (denoted here as "a"), stored in the memory 305, between the LED 102a and the LED 102b in the space S and (ii) the calculated angles θ1 and θ2.

Furthermore, the position information acquirer 336 uses the formula Z1=X×tan θ1 to calculate a difference Z1 between the Z coordinate Hc of the setup position of the camera 200a and the Z coordinate of the LED 102a in the space S, and uses a formula Z2=X×tan θ2 to calculate a difference Z2 between the Z coordinate setup position of the camera 200a and the Z coordinate of the LED 102b. The three-dimensional positions of the LEDs 102a and 102b in the space S are determined by such procedure.

Figure 5:
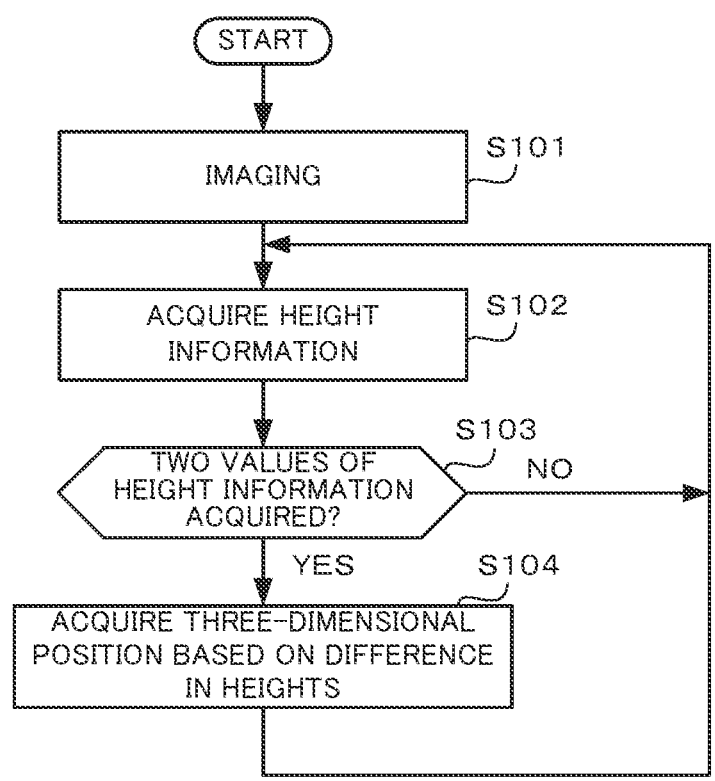
FIG. 5 is a flowchart illustrating an example of processing performed by the camera and the server according to Embodiment 1 of the present disclosure.

FIG. 5 is a flowchart illustrating an example of processing performed by the camera 200 and the server 300. In the aforementioned manner, at the forklift 100a, the LED 102a emits light corresponding to the ID thereof as height information of the LED 102a, and the LED 102b emits light corresponding to the ID thereof as height information of the LED 102b.

In this case, upon the camera 200 performing imaging (step S101), the detector 332 within the controller 302 of the server 300 acquires the brightness value of each pixel included in the frame obtained by imaging, regards the positions of the pixels having brightness values greater than or equal to a prescribed value to be positions of the LEDs 102a and 102b, and performs decoding processing based on change in light emission occurring at the positions of the LEDs 102a and 102b. The height information acquirer 334 acquires the IDs as height information transmitted by the LEDs 102a and 102b, which is obtained by decoding processing by the detector 332 (step S102).

The position information acquirer 336 determines whether the IDs that are the height information of the LEDs 102a and 102b, that is, the IDs that are the two values of the height information, are acquired (step S103). In the case in which the IDs that are the two values of the height information are not acquired (NO in step S103), the processing of step S102 and beyond is repeated.

However, in the case in which the IDs that are the two values of the height information are acquired (YES in step S103), the position information acquirer 336, based on the difference in height corresponding to the two values of the height information, acquires the three-dimensional positions of the LEDs 102a and 102b (step S104). Specifically, in the aforementioned manner, the position information acquirer 336 uses the formula X=a/(tan θ1−tan θ2) to calculate the distance X between the camera 200 and the LEDs 102a and 102b in the XY plane defined by the X axis and the Y axis, and further calculates the difference Z1 between the Z coordinate of the setup position of the camera 200 and the Z coordinate of the LED 102a based on the formula Z1=X×tan θ1, and calculates the difference Z2 between the Z coordinate of the setup position of the camera 200 and the Z coordinate of the LED 102b based on the formula Z2=X×tan θ2, Due to such operation, in Embodiment 1, the LEDs 102a and 102b attached to the fork 101a of the forklift 100a emit light corresponding to the IDs of the LEDs 102a and 102b as height information of the LEDs 102a and 102b. However, the server 300 determines the positions of the LEDs 102a and 102b within the frame obtained by imaging by the camera 200, and further acquires the three-dimensional positions of the LEDs 102a and 102b based on (i) the positions of the LEDs 102a and 102b in the picture image and (ii) the setup position, the imaging direction, and the imaging range information of each of the cameras 200 in the space S. By using the two LEDs 102a and 102b in this manner, even if only a single camera 200 is capable of imaging the LEDs 102a and 102b, the three-dimensional positions of these LEDs 102a and 102b, as well as the three-dimensional positions of the forklift 100a or the fork 101a, can be acquired.

Figure 6:
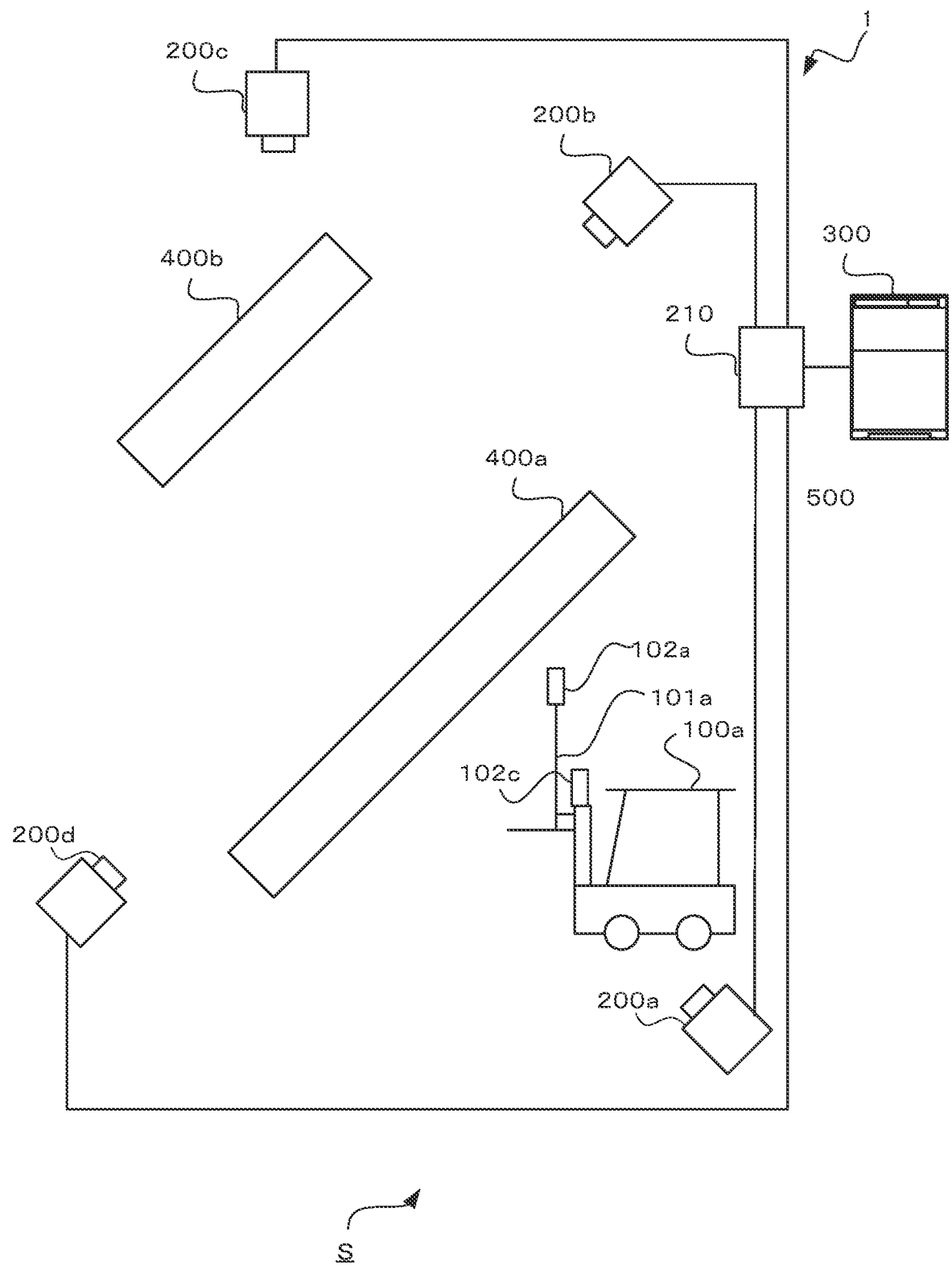
FIG. 6 illustrates an example of a visible light communication system according to Embodiment 2 of the present disclosure.
Figure 7:
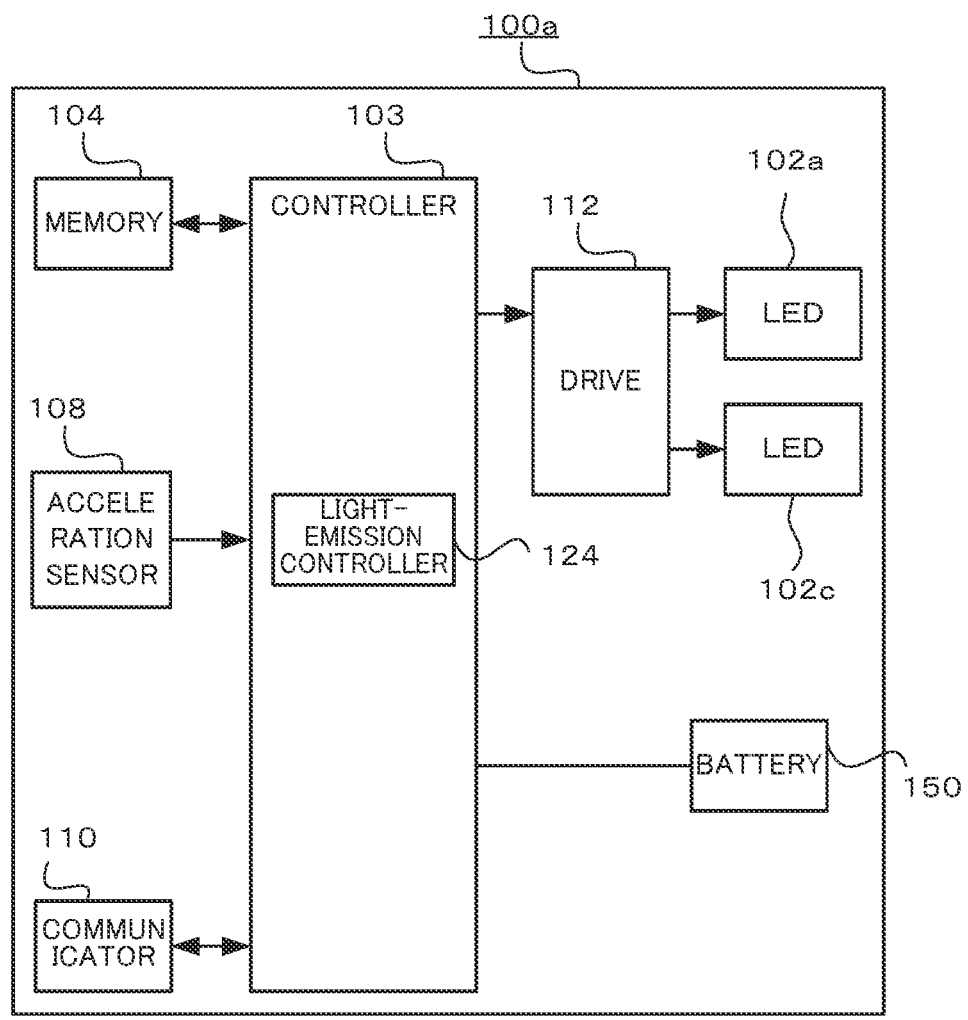
FIG. 7 illustrates an example of configuration of a forklift according to Embodiment 2 of the present disclosure.

Embodiment 2 is described next. FIG. 6 illustrates an example of a visible light communication system according to Embodiment 2, and FIG. 7 illustrates an example of configuration of the forklift. Upon comparison with Embodiment 1, in the visible light communication system 1 illustrated in FIG. 6 and the forklift 100a illustrated in FIG. 7, the LED 102b is not attached to the fork 101a of the forklift 100a, although an LED 102c is attached to the body of the forklift 100a. Furthermore, the camera 200 and the server 300 are configured similarly to Embodiment 1.

When the fork 101a moves in the Z-axis direction in the present embodiment, only the LED 102a moves, and due to attachment to the body of the forklift 100a, the LED 102c does not move. Furthermore, in the present embodiment, the Z coordinate of the LED 102c is stored in the memory 305 within the server 300 as a fixed value of a standard height.

The light-emission controller 124 within the controller 103 of the forklift 100a senses movement of the fork 101a in the vertical direction, that is, in the Z-axis direction, and determines the position in the Z-axis direction within the space S for the LED 102a attached to the fork 101a. Furthermore, the light-emission controller 124 generates information, that is, height information, relating to the Z-axis direction position of the LEDs 102a and 102c and corresponding to the heights of the LEDs 102a and 102c in the space S. Here, the light-emission controller 124 generates as height information the ID that includes the identification information of the LEDs 102a and 102c. Moreover, the light emission controller 124 generates as height information an ID, for the LED 102c, including information indicating identification information of the LED 102c and information indicating that the LED 102c is at the standard height. Furthermore, the light-emission controller 124 for the LED 102a determines a light-emission pattern for causing time-sequential change in the light emission corresponding to the ID that is the height information of the LED 102a, and for the LED 102c determines a light-emission pattern for causing time-sequential change in the light emission corresponding to the ID that is height information of the LED 102c.

Furthermore, the drive 112 (i) generates a drive signal for causing time-wise change in the light emission of the LED 102a in accordance with the information of the light-emission pattern of the LED 102a from the light-emission controller 124, and (ii) generates a drive signal for causing time-wise change in the light emission of the LED 102c in accordance with the information of the light-emission pattern of the LED 102c from the light-emission controller 124. The LEDs 102a and 102c generate emitted light that changes in a time-wise manner in accordance with a drive signal output from the drive 112.

The detector 332 and the height information acquirer 334 in the controller 302 of the server 300 perform processing similarly to that of Embodiment 1.

Based on the ID that is the height information of the LED 102a and the ID that is the height information of the LED 102c, the position information acquirer 336 acquires the three-dimensional positions of the LEDs 102a and 102c.

Figure 8:
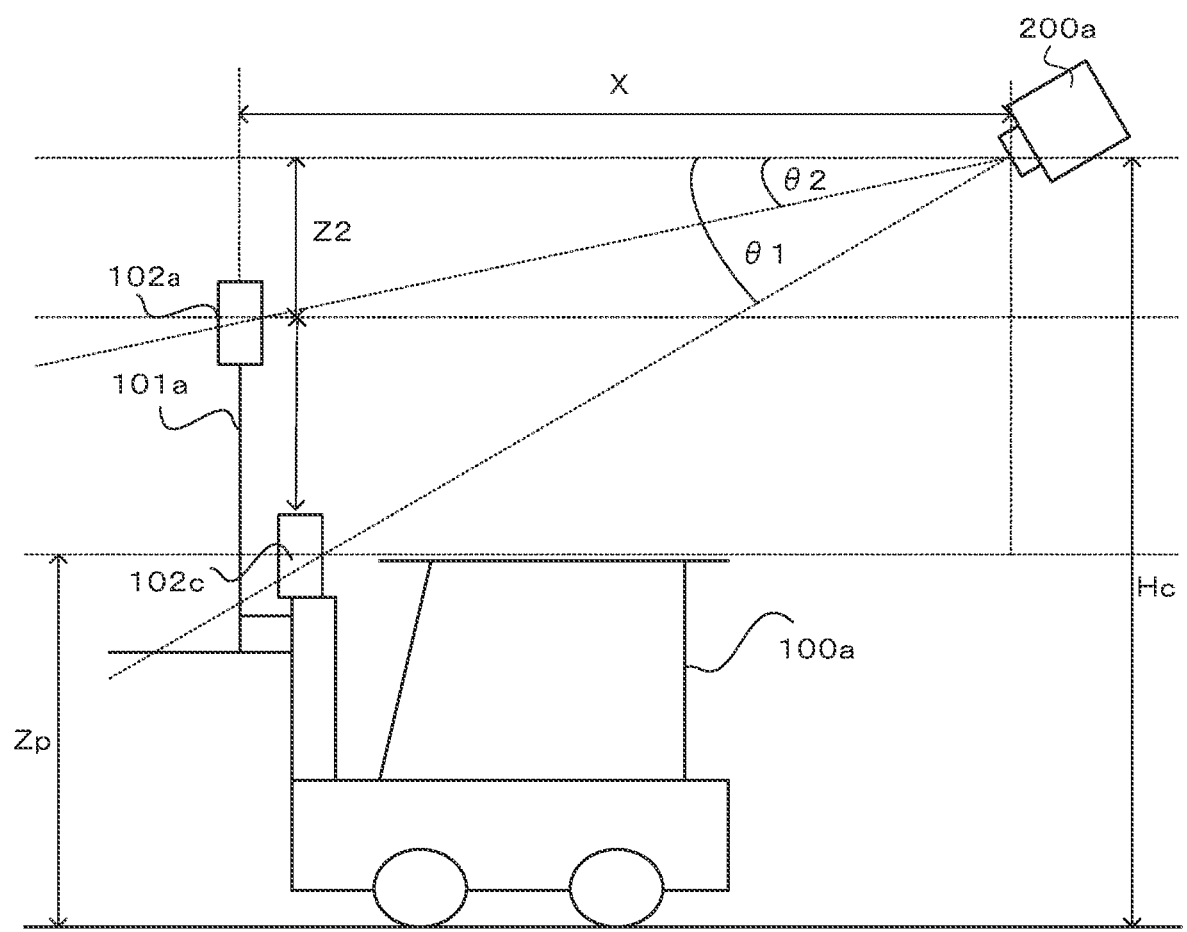
FIG. 8 illustrates an aspect of acquisition of a three-dimensional position of an LED according to Embodiment 2 of the present disclosure.

FIG. 8 illustrates an aspect of acquisition of the three-dimensional positions of the LEDs 102a and 102c. In the example illustrated in FIG. 8, the LED 102c is present at the standard height. Z coordinate Zp information of the LED 102c indicating the standard height is stored in the memory 305 within the server 300. The LED 102a emits light corresponding to the ID thereof as height information, and the LED 102c emits light corresponding to the ID thereof as height information.

In this case, the position information acquirer 336 calculates the angles θ1 and θ2 based on the imaging directions, the imaging ranges, and the positions of the LEDs 102a and 102c occurring in the picture image.

Thereafter, the position information acquirer 336, by the formula X=(Hc−Zp)/tan θ1, calculates the distance X between the LEDs 102a and 102c and the camera 200a in the XY plane defined by the X axis and the Y axis, based on the Z coordinate Hc of the setup position of the camera 200a in the space S, a Z coordinate Zp indicating the standard height of the LED 102c, and the calculated θ1.

Furthermore, the position information acquirer 336 calculates a difference Z2 between the Z coordinate of the LED 102a and the Z coordinate Hc of the setup position of the camera 200 in the space S by use of the calculated X and θ2 and the formula Z2=X×tan θ2. Due to such operation, the three-dimensional position of the LEDs 102a and 102c in the space S are determined.

Figure 9:
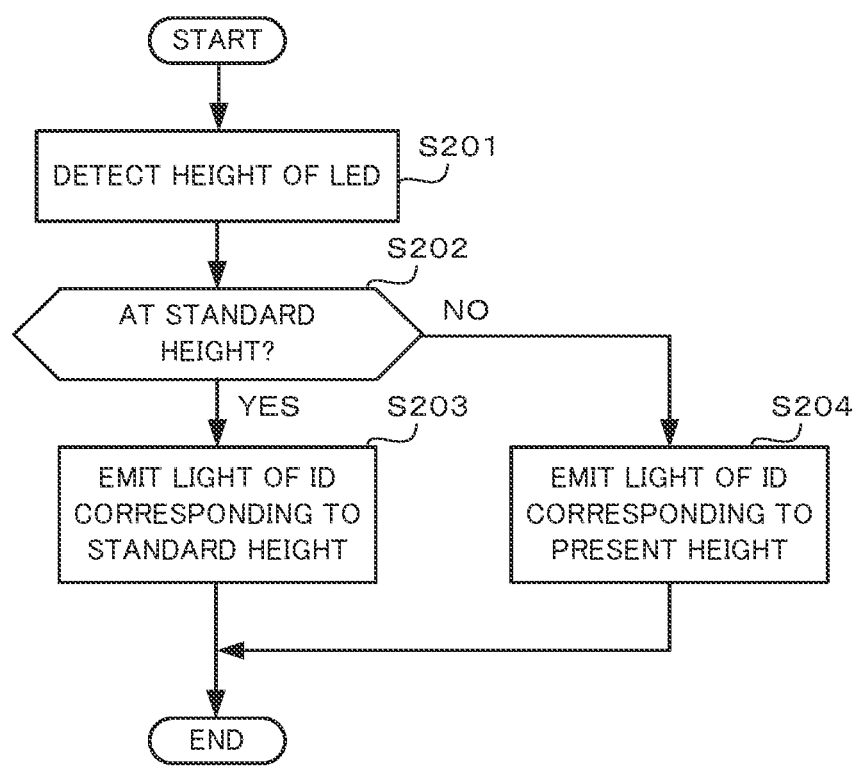
FIG. 9 is a flowchart illustrating an example of processing performed by the forklift according to Embodiment 2 of the present disclosure.

FIG. 9 is a flowchart illustrating an example of processing performed by the forklift 100a. Although the processing illustrated in FIG. 9 is that relating to the light-emission control of the LED 102a, light-emission control of the LED 102c is similar.

As illustrated in FIG. 9, the light-emission controller 124 within the controller 103 of the forklift 100a detects the position (height) of the LED 102a in the Z-axis direction occurring in the space S (step S201).

Next, the light-emission controller 124 determines whether the LED 102a is at the standard height (step S202). If the LED 102a is at the standard height (YES in step S202), the light-emission controller 124 generates as height information the ID that includes the information indicating that the height is standard and the identification information of the LED 102a, and then causes the LED 102a to emit light using the light-emission pattern corresponding to the ID (step S203).

However, in the case in which the LED 102a is not at the standard height (NO in step S202), the light-emission controller 124 generates as the height information an ID that includes the Z coordinate of the LED 102a and the identification information, and causes the LED 102a to emit light using the light-emission pattern corresponding to the ID (step S204).

Thereafter, the server 300 acquires the three-dimensional positions of the LEDs 102a and 102c in the aforementioned manner.

In this manner in Embodiment 2, the LED 102a attached to the fork 101a of the forklift 100a and the LED 102c attached to the body perform light emission corresponding to the ID of the LEDs 102a and 102c as height information of the LEDs 102a and 102c, respectively. However, the server 300 determines the positions of the LEDs 102a and 102c within the frame obtained by imaging by the cameras 200, and acquires the three-dimensional positions of the LEDs 102a and 102c based on the Z coordinate Zp indicating standard height of the LED 102c stored in the memory 305, the positions of the LEDs 102a and 102c occurring in the picture image, the setup positions of the cameras 200 occurring in the space S, and information of the imaging direction and imaging range. Due to use of the two LEDs 102a and 102c in this manner, even when only a single camera 200 is capable of imaging the LEDs 102a and 102c, the three-dimensional positions of such LEDs 102a and 102c, and also the three-dimensional position of the forklift 100a or the fork 101a, can be acquired.

Figure 10:
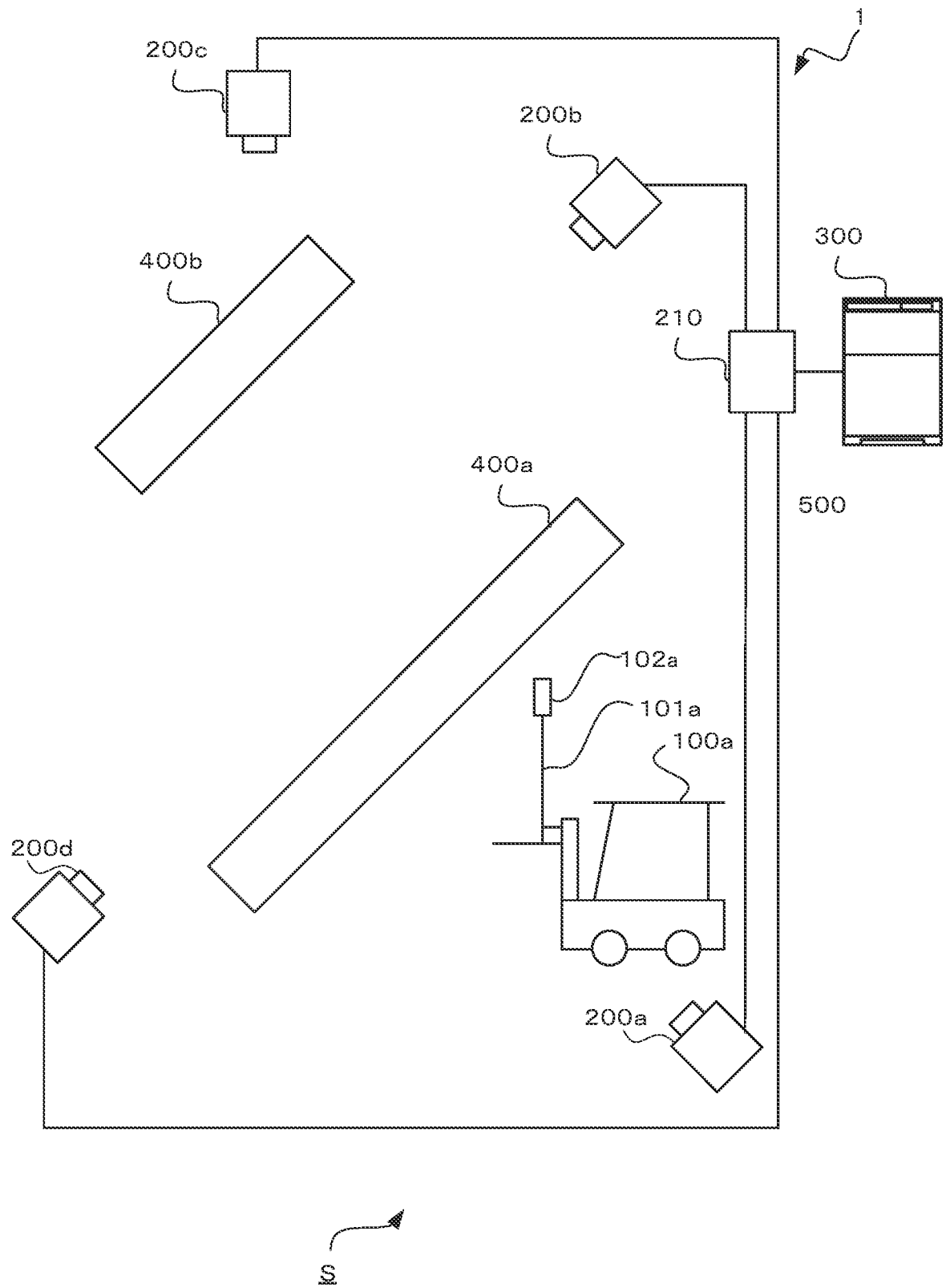
FIG. 10 illustrates an example of a visible light communication system according to Embodiment 3 of the present disclosure.
Figure 11:
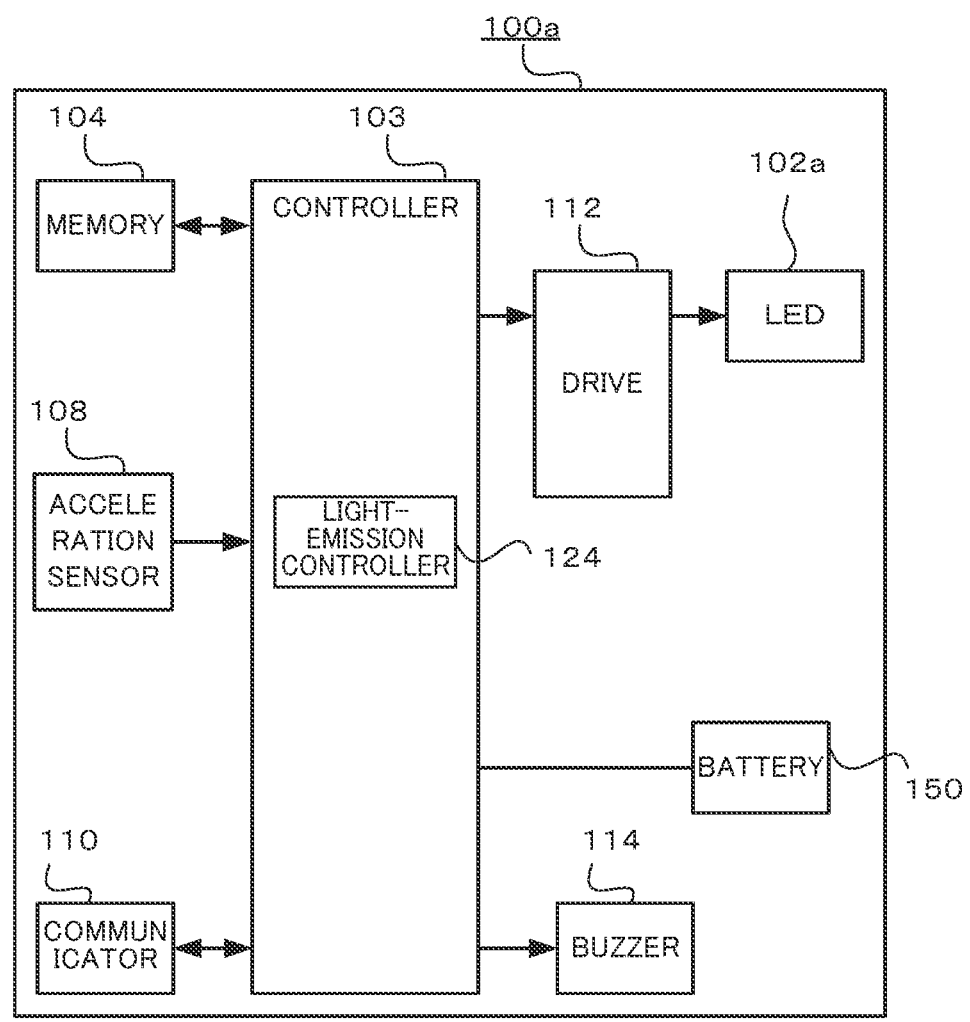
FIG. 11 illustrates an example of configuration of a forklift according to Embodiment 3 of the present disclosure.

Embodiment 3 is described next. FIG. 10 illustrates an example of a visible light communication system according to Embodiment 3, and FIG. 11 illustrates an example of configuration of the forklift. In the visible light communication system 1 illustrated in FIG. 10 and the forklift 100a illustrated in FIG. 11, upon comparison with Embodiment 1, although no LED 102b is attached to the fork 101a of the forklift 100a, a buzzer 114 is attached within the forklift 100a. Moreover, the communicator 110 can be used to obtain vertical direction movement amount information for the fork 101a. The camera 200 and the server 300 are configured similarly to Embodiment 1.

In the present embodiment, the LED 102a moves where there is Z-axis direction movement of the fork 101a. In the present embodiment, the standard height Z coordinate of the LED 102a is stored as a fixed value in the memory 305 within the server 300. The "standard height" is the height of the LED 102a when the fork 101a is at the lowest position, that is, the initial position.

The light-emission controller 124 within the controller 103 of the forklift 100a, when performing three-dimensional position acquisition of the LED 102a, determines movement and stoppage in of the forklift 100a in the XY plane based on acceleration from the acceleration sensor 108. In the case in which the forklift 100a is presently moving in the XY plane, the light-emission controller 124 causes the buzzer 114 to sound to prompt the operator to stop the forklift 100a.

After stoppage of the forklift 100a in the XY plane, the light-emission controller 124 senses movement of the fork 101a in the vertical direction, that is, the Z-axis direction, and determines the Z-axis direction position in the space S for the LED 102a attached to the fork 101a. The light-emission controller 124 then determines the Z-axis position of the LED 102a occurring in the space S, in each of the case in which the fork 101a is present at the initial position and the case in which the fork 101a is moved from the initial position.

Furthermore, the light-emission controller 124 generates information, that is, height information, relating to the Z-axis direction position of the LED 102*a* corresponding to the height of the LED 102*a* occurring in the space S. Here, in the case in which the fork 101*a* is at the initial position, the light-emission controller 124 generates as the height information the ID that includes (i) the information indicating that the LED 102*a* is at the standard height and (ii) the identification information of the LED 102*a*. In the case in which the fork 101*a* is moved from the initial position, the light-emission controller 124 generates as the height information the ID including the Z coordinate of the LED 102*a* and the identification information of the LED 102*a*. Further, in the case in which the fork 101*a* is at the initial position, the light-emission controller 124 determines a light-emission pattern that causes time-sequential change in light emission corresponding to the ID that is the height information of the LED 102*a*. Moreover, in the case of prior movement of the fork 101*a* from the initial position, the light-emission controller 124 determines the light-emission pattern for causing time-sequential change in light emission corresponding to the ID that is the height information of the LED 102*a*.

Furthermore, the drive 112 generates the drive signal for causing time-wise change in the light emission of the LED 102*a* in accordance with the light-emission pattern information of the LED 102*a* from the light-emission controller 124. The LED 102*a* emits light that varies in a time-wise manner in accordance with the drive signal output from the drive 112. Due to such operation, the LED 102*a* performs light emission by causing time-sequential change in light emission corresponding to the ID that is the height information of the LED 102*a*, in each of the case in which the fork 101*a* is at the initial position and the case in which the fork 101*a* is previously moved from the initial position.

The detector 332 and the height information acquirer 334 in the controller 302 of the server 300 operate similarity to such in Embodiment 1.

The position information acquirer 336 acquires the three-dimensional position of the LED 102*a* based on the ID that is the height information of the LED 102*a*.

Figure 12:
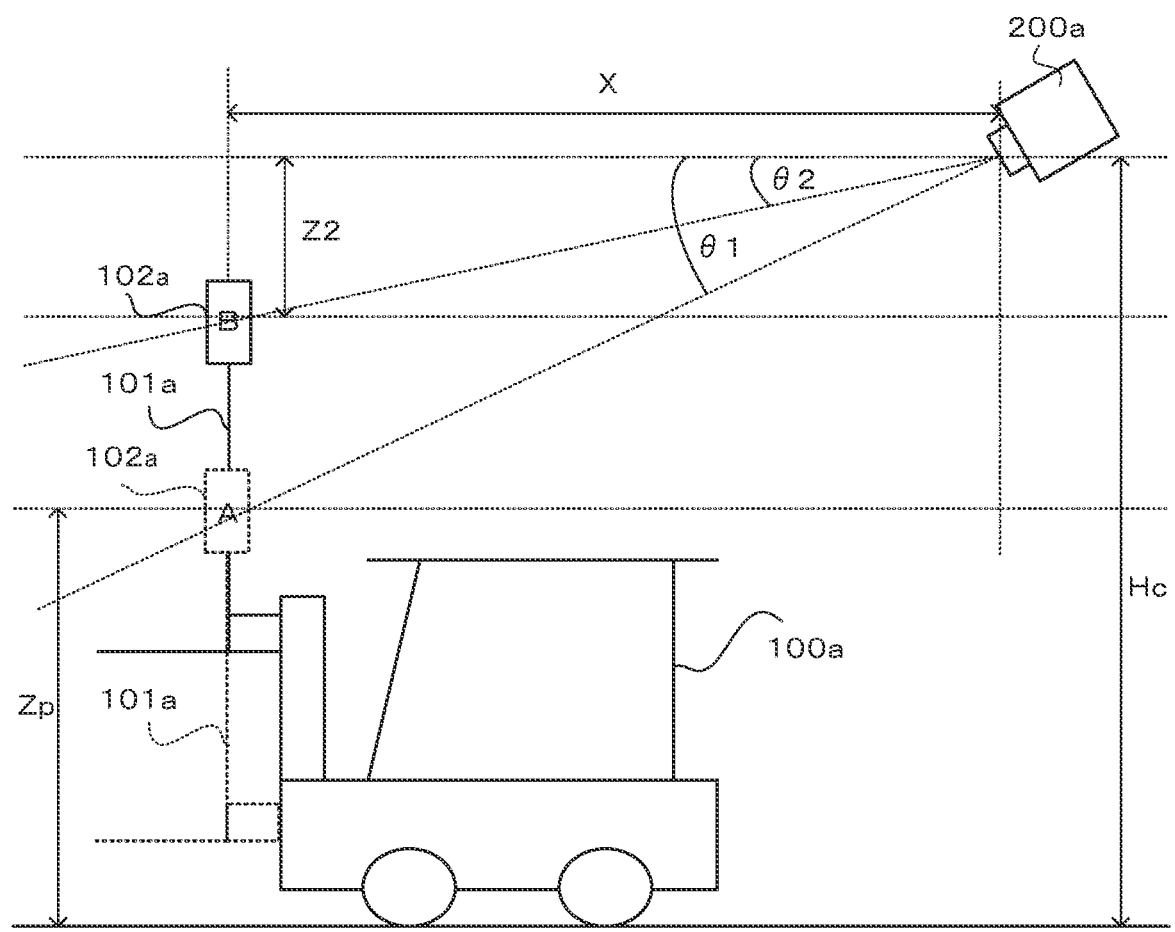
FIG. 12 illustrates an aspect of acquisition of a three-dimensional position of an LED according to Embodiment 3 of the present disclosure.

FIG. 12 illustrates an aspect of three-dimensional position acquisition of the LED 102*a*. In the example illustrated in FIG. 12, in accordance with movement of the fork 101*a* while the forklift 100*a* is stopped in the XY plane, the LED 102*a* moves from a position A that is the standard height to a position B. Information of the Z coordinate Zp of the LED 102*a* indicating the standard height is stored in the memory 305 of the server 300. The LED 102*a* emits light corresponding to the ID thereof as the height information at each of the A position and the B position.

In this case, the position information acquirer 336 calculates the angles $\theta1$ and $\theta2$ based on information of the imaging direction, the imaging range, and the positions in the picture image of the LED 102*a* at the A position and the LED 102*a* at the B position.

Thereafter, the position information acquirer 336 calculates the distance X between the camera 200*a* and the LED 102*a* occurring in the XY plane defined by the X axis and the Y axis by use of the formula $X=(Hc-Zp)/\tan\theta1$ and the Z coordinate Hc of the setup position of the camera 200*a* in the space S, the Z coordinate Zp indicating the standard height of the LED 102*a* of the A position, and the angle $\theta1$.

Furthermore, the position information acquirer 336 calculates a difference Z2 between the Z coordinate Hc of the setup position of the camera 200*a* in the space S and the Z coordinate of the LED 102*a* by using the formula $Z2=X\times\tan\theta2$ and the calculated X and $\theta2$. The three-dimensional position of the LED 102*a* in the space S is determined by such operation.

Figure 13:
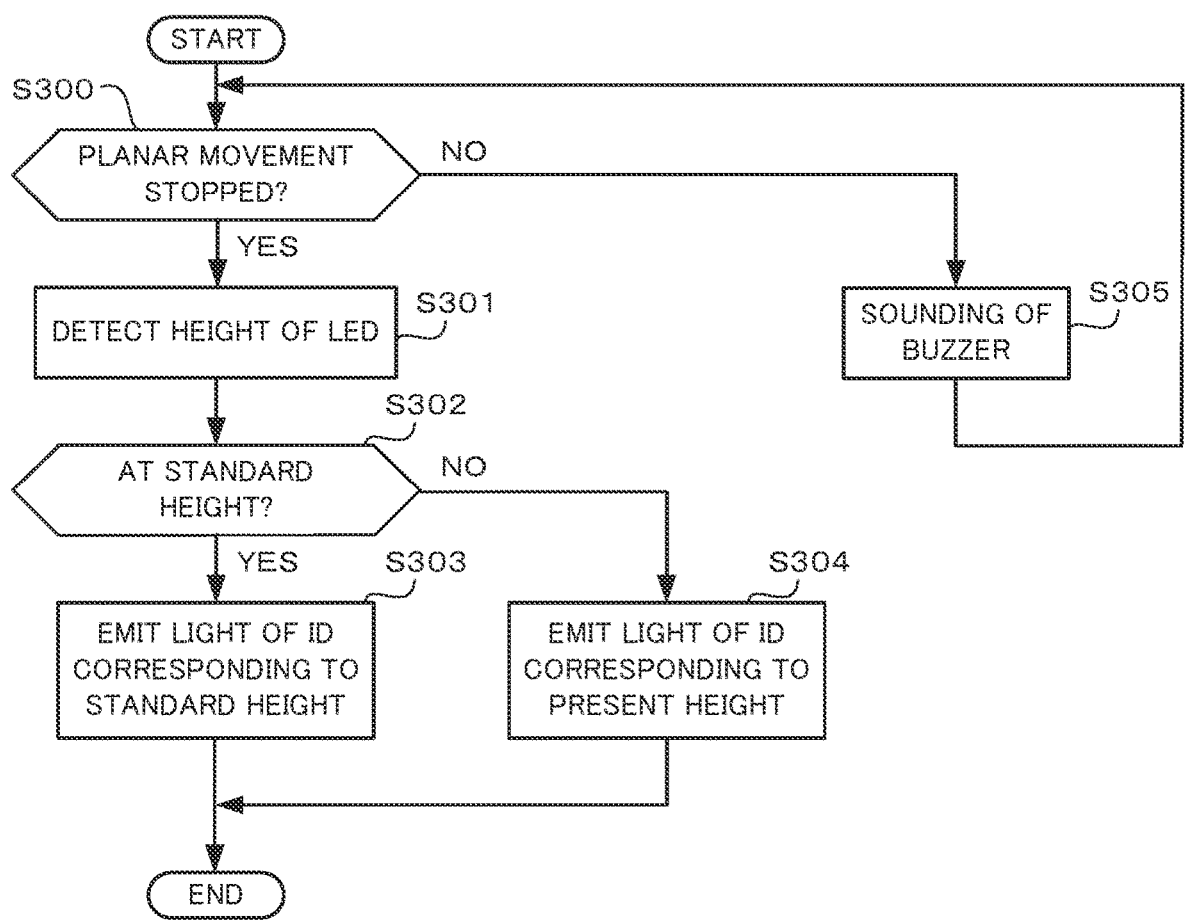
FIG. 13 is a flowchart illustrating an example of processing performed by the forklift according to Embodiment 3 of the present disclosure.

FIG. 13 is a flowchart illustrating an example of processing performed by the forklift 100*a*. As illustrated in FIG. 13, the light-emission controller 124 within the controller 103 of the forklift 100*a* determines whether movement of the forklift 100*a* in the XY plane, that is, planar movement, is stopped (step S300).

If planar movement of the forklift 100*a* is stopped (YES in step S300), the light-emission controller 124 detects the Z-axis direction position, that is, the height, of the LED 102*a* in the space S (step S301).

Thereafter, the light-emission controller 124 determines whether the LED 102*a* is at the standard height (step S302). If the LED 102*a* is at the standard height (YES in step S302), the light-emission controller 124 generates as height information the ID including the information indicating that the height is the standard height and the identification information of the LED 102*a*, and causes the LED 102*a* to emit light using the light-emission pattern corresponding to the ID (step S303).

However, if the LED 102*a* is not at the standard height (NO in step S302), the light-emission controller 124 generates as the height information the ID including the identification information, and causes the LED 102*a* to emit light using the light-emission pattern corresponding to the ID (step S304).

Moreover, when planar movement of the forklift 100*a* is in progress (NO in step S300), the light-emission controller 124 causes the buzzer 114 to sound to prompt the operator to stop movement of the forklift 100*a* (step S305). Thereafter, the operations of step S300 and beyond are repeated.

Thereafter, the server 300 acquires the three-dimensional position of the LED 102*a* in the aforementioned manner.

In this manner in Embodiment 3, when movement of the forklift 100*a* is stopped in the XY plane, the LED 102*a* attached to the fork 101*a* of the forklift 100*a* emits light corresponding to the ID of the LED 102*a*, and corresponding to the case of movement of the fork 101*a* from the initial position, or the case of presence at the intuition position. However, the server 300 acquires the three-dimensional position of the LED 102*a* based on (i) the position for the LED 102*a* within the frame obtained by imaging by the camera 200 when the fork 101*a* is present at the initial position, (ii) the Z coordinate Zp indicating the standard height of the LED 102*a* stored in the memory 305, (iii) the initial position and the position occurring in the picture image after movement of the LED 102*a*, and (iv) the setup position, the imaging direction, and the imaging range of each camera 200 in the space S. By using (i) the position in the case of the fork 101*a* being positioned at the initial position where the one LED 102*a* is located in this manner and (ii) the position after movement from the initial position, even if only one camera 200 is capable of imaging the LED 102*a*, acquisition is enabled for the three-dimensional position of the LED 102*a*, and further, the three-dimensional position of the forklift 100*a* or the fork 101*a*.

Furthermore, the present disclosure is not limited to the aforementioned description and drawings of embodiments, and modifications can be appropriately added to the aforementioned embodiments and drawings.

For example, in the aforementioned Embodiment 2, the light-emission controller 124 within the forklift 100*a* generates as the height information the ID that includes (i) the information indicated that the LED 102*c* is at the standard height and (ii) the identification information of the LED 102c, and the LED 102c emits light in accordance with the corresponding light-emission pattern. However, this configuration is not limiting, and a configuration may be used that enables the server 300 to be aware that the LED 102c is present at the standard height by light emission from the LED 102c present at the standard height differing from that of the LED 102a, for example, by causing emission of light of a different color.

Moreover, the light-emission controller 124 within the forklift 100a in the aforementioned Embodiment 3 generates as the height information the ID that includes the information indicating that the LED 102a is at the standard height and the identification information of the LED 102a, and causes the LED 102a to emit light using the corresponding light-emission pattern. However, such configuration is not limiting, and the server 300 may be capable of recognizing that the LED 102a is present at the standard height by light emission that differs, such as by light emission of a different color, for the case in which the LED 102a is present at the standard height versus the case otherwise.

Moreover, the forklift 100a may be configured to transmit to the server 300 the Z coordinate that indicates the Z-axis direction position, that is, the height, of the LED 102a in the space S. The method of transmission may be visible light communication or wireless communication.

Moreover, although the aforementioned embodiments describe the use of communication by red, green, and blue visible light, visible light of another color may be used. Moreover, visible light communication by modulation of information, by time-wise change in just brightness, can be used appropriating in the present disclosure.

Moreover, the light source within the forklift 100a is not limited to an LED. For example, the light source may be included in part of an LCD, PDP, EL display, or the like included in a display device.

Furthermore, the camera 200 may be provided within the server 300.

Moreover, in the aforementioned embodiments, a program for execution may be stored and distributed on a computer readable recording medium such as a flexible disc, a compact disc read-only memory (CD-ROM), a digital versatile disc (DVD), a magneto-optical (MO) disc, or the like, and the system for executing the above processing may be formed by installation of such a program.

Moreover, the program may be stored beforehand on a disc device or the like included in a prescribed server on a network such as the Internet, and may be superimposed on a carrier wave, for example, and then downloaded or the like.

Furthermore, in the case of achievement of the aforementioned functions by allocation to the operating system (OS), or achievement in cooperation between the OS and an application, or the like, the non-OS portion itself may be stored in a medium for distribution, downloading, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A position measuring device comprising:
an imager and
at least one processor configured to execute a program stored in a memory, wherein
the at least one processor
detects, from an imaging range of a picture image acquired by the imager, a light-emitter image of a first light emitter that is capable of movement in a space and emits light corresponding to identification information of the first light emitter in the space, and
upon detection of a first position of the light-emitter image of the first light emitter in the picture image in a case in which the first light emitter is at a first height and a second position of the light-emitter image of the first light emitter in the picture image in a case in which the first light emitter is at a second height, acquires a three-dimensional position of the first light emitter in the space based on the first position and the second position.

2. The position measuring device according to claim 1, wherein
the at least one processor
acquires the identification information based on the detected light-emitter image of the first light emitter, and
acquires the three-dimensional position of the first light emitter in the space based on the position of the detected light-emitter image of the first light emitter in the picture image and the acquired identification information.

3. The position measuring device according to claim 1, wherein
the at least one processor
acquires the three-dimensional position of the first light emitter in the space based on a setup position and an imaging direction of the imager in the space in addition to the position of the light-emitter image of the first light emitter.

4. The position measuring device comprising:
an imager and
at least one processor configured to execute a program stored in a memory, wherein
the at least one processor
detects, from an imaging range of a picture image acquired by the imager, a light-emitter image of a first light emitter that is capable of movement in a space and emits light corresponding to identification information of the first light emitter in the space,
detects, from the imaging range of the picture image acquired by the imager, a light-emitter image of a second light emitter that is capable of movement in the space and emits light corresponding to identification information of the second light emitter in the space wherein the identification information of the second light emitter is different from the identification information of the first light emitter, and
acquires the three-dimensional position of the first light emitter in the space based on a position of the detected light-emitter image of the first light emitter in the picture image and a position of the detected light-emitter image of the second light emitter in the picture image.

5. The position measuring device according to claim 4, wherein
the at least one processor
acquires the three-dimensional position of the first light emitter in the space based on a setup position and an imaging direction of the imager in the space in addition to the position of the detected light-emitter image of the first light emitter in the picture image and the position of the detected light-emitter image of the second light emitter in the picture image.

6. The position measuring device according to claim 4, wherein
time-sequential change in light emission of the first light emitter in accordance with the identification information of the first light emitter is different from time-sequential change in light emission of the second light emitter in accordance with the identification information of the second light emitter.

7. The position measuring device comprising:
an imager and
at least one processor configured to execute a program stored in a memory, wherein
the at least one processor
detects, from an imaging range of a picture image acquired by the imager, a light-emitter image of a first light emitter that is capable of movement in a space and emits light corresponding to identification information of the first light emitter in the space,
detects, from the picture image, a light-emitter image of a second light emitter disposed at a known height and regarded as having a position on a plane in the space that is the same as that of the first light emitter, and
acquires the three-dimensional position of the first light emitter in the space based on the position of the detected light-emitter image of the first light emitter in the picture image and the position of the detected light-emitter image of the second light emitter in the picture image.

8. The position measuring device according to claim 7, wherein
the at least one processor acquires the three-dimensional position of the first light emitter in the space based on a setup position and an imaging direction of the imager in the space in addition to the position of the detected light-emitter image of the first light emitter in the picture image and the position of the detected light-emitter image of the second light emitter in the picture image.

9. A position measuring method for a position measuring device, the method comprising:
detecting, from an imaging range of a picture image acquired by an imager, a light-emitter image of a first light emitter that is capable of movement in a space and emits light corresponding to identification information of the first light emitter in the space; and
upon detection of a first position of the light-emitter image of the first light emitter in the picture image in a case in which the first light emitter is at a first height and a second position of the light-emitter image of the first light emitter in the picture image in a case in which the first light emitter is at a second height, a three-dimensional position of the first light emitter in the space is acquired based on the first position and the second position.

10. The position measuring method for a position measuring device, the method comprising:
detecting, from an imaging range of a picture image acquired by an imager, a light-emitter image of a first light emitter that is capable of movement in a space and emits light corresponding to identification information of the first light emitter in the space,
detecting, from the imaging range of the picture image acquired by the imager, a light-emitter image of a second light emitter that is capable of movement in the space and emits light corresponding to identification information of the second light emitter in the space wherein the identification information of the second light emitter is different from the identification information of the first light emitter, and
acquiring the three-dimensional position of the first light emitter in the space based on a position of the detected light-emitter image of the first light emitter in the picture image and (ii) a position of the detected light-emitter image of the second light emitter in the picture image.

11. The position measuring method for a position measuring device, the method comprising:
detecting, from an imaging range of a picture image acquired by an imager, a light-emitter image of a first light emitter that is capable of movement in a space and emits light corresponding to identification information of the first light emitter in the space,
detecting, from the picture image, a light-emitter image of a second light emitter disposed at a known height and regarded as having a position on a plane in the space that is the same as that of the first light emitter, and
acquiring the three-dimensional position of the first light emitter in the space is based on the position of the detected light-emitter image of the first light emitter in the picture image and the position of the detected light-emitter image of the second light emitter in the picture image.

12. A non-transitory computer-readable recording medium recording a program executable by at least one processor of a position measuring device, the program causing the at least one processor to:
detect, from an imaging range of a picture image acquired by an imager, a light-emitter image of a first light emitter that is capable of movement in a space and emits light corresponding to identification information of the first light emitter in the space; and
upon detection of a first position of the light-emitter image of the first light emitter in the picture image in a case in which the first light emitter is at a first height and a second position of the light-emitter image of the first light emitter in the picture image in a case in which the first light emitter is at a second height, the at least one processor acquires a three-dimensional position of the first light emitter in the space based on the first position and the second position.

13. A non-transitory computer-readable recording medium recording a program executable by at least one processor of a position measuring device, the program causing the at least one processor to:
detect, from an imaging range of a picture image acquired by an imager, a light-emitter image of a first light emitter that is capable of movement in a space and emits light corresponding to identification information of the first light emitter in the space,
detect, from the imaging range of a picture image acquired by the imager, a light-emitter image of a second light emitter that is capable of movement in the space and emits light corresponding to identification information of the second light emitter in the space wherein the identification information of the second light emitter is different from the identification information of the first light emitter, and acquire the three-dimensional position of the first light emitter in the space based on a position of the detected light-emitter image of the first light emitter in the picture image and a position of the detected light-emitter image of the second light emitter in the picture image.

14. A non-transitory computer-readable recording medium recording a program executable by at least one processor of a position measuring device, the program causing the at least one processor to:

detect, from an imaging range of a picture image acquired by an imager, a light-emitter image of a first light emitter that is capable of movement in a space and emits light corresponding to identification information of the first light emitter in the space, detect, from the picture image, a light-emitter image of a second light emitter disposed at a known height and regarded as having a position on a plane in the space is the same as that of the first light emitter, and acquire the three-dimensional position of the first light emitter in the space based on the position of the detected light-emitter image of the first light emitter in the picture image and the position of the detected light-emitter image of the second light emitter in the picture image.

\* \* \* \* \*